United States Patent [19]

Lee et al.

[11] Patent Number: 5,040,718

[45] Date of Patent: Aug. 20, 1991

[54] METHOD OF REPAIRING DAMAGES IN SUPERALLOYS

[75] Inventors: Jack W. Lee, Brookfield; Jule A. Miller, Derby; Michael A. Iovene, Woodbridge, all of Conn.

[73] Assignee: Avco Corporation, Providence, R.I.

[21] Appl. No.: 241,347

[22] Filed: Sep. 9, 1988

Related U.S. Application Data

[63] Continuation-in-part of Ser. No. 109,487, Oct. 16, 1987, abandoned.

[51] Int. Cl.⁵ ............................................. G23K 31/02
[52] U.S. Cl. ................................... 228/119; 228/198; 228/248; 419/9; 419/46
[58] Field of Search ............... 228/119, 194, 248, 170, 228/263.13, 198; 419/9, 46, 47

[56] References Cited

U.S. PATENT DOCUMENTS

| | | | |
|---|---|---|---|
| 3,155,491 | 11/1964 | Hoppin | 75/255 |
| 3,246,981 | 4/1966 | Quaas | 75/255 |
| 3,441,409 | 4/1969 | Burr | 419/46 X |
| 3,496,630 | 2/1970 | Duff | 228/198 |
| 3,619,182 | 11/1971 | Bieber et al. | 420/448 |
| 3,678,570 | 7/1972 | Paulonis | 228/194 |
| 3,716,347 | 2/1973 | Bergstrom et al. | 419/9 |
| 3,807,993 | 4/1974 | Dalal et al. | 420/448 |
| 4,008,844 | 2/1977 | Duvall | 228/119 |
| 4,219,592 | 8/1980 | Anderson | 427/405 |
| 4,283,225 | 8/1981 | Sexton | 420/442 |
| 4,285,459 | 8/1981 | Baladjanian | 228/119 |
| 4,289,833 | 9/1981 | Hachisuka | 419/47 X |
| 4,444,353 | 4/1984 | McMurray | 228/119 |
| 4,478,638 | 10/1984 | Smith et al. | 228/119 X |
| 4,556,532 | 12/1984 | Umeha et al. | 419/9 |
| 4,614,296 | 9/1986 | Lesgourgues | 228/119 |

*Primary Examiner*—Stephen J. Lechert, Jr.
*Attorney, Agent, or Firm*—Perman & Green

[57] ABSTRACT

A method of repairing damages in a superalloy component is disclosed wherein existing brazed joints and protective coatings are not harmed. The method entails the use of a silicon-free metal mixture comprising (i) a low melting alloy having a liquidus below the temperature to be used to deposit the metal mixture, (ii) an alloy melting above about 2100° F., and (iii) optionally nickel. The resultant repair has a solidus temperature of at least 1950° F., preferably at least 2000°.

27 Claims, No Drawings

METHOD OF REPAIRING DAMAGES IN SUPERALLOYS

CROSS REFERENCE TO RELATED APPLICATIONS

This application is a continuation-in-part of U.S. Ser. No. 109,487, filed Oct. 16, 1987, now abandoned.

BACKGROUND OF THE INVENTION

1. Field of the Invention

This invention relates generally to silicon-free metal alloy powder mixtures useful for filling holes and slots and repairing and reforming damaged surface areas in high temperature engine components. In particular, the invention relates to novel metal alloy mixtures which have the ability to repair many service damaged components which are presently considered non-repairable. Also, the present metal alloy powder mixtures can be used in new part fabrication and/or for the reformation of eroded or damaged surface areas, such as the tips of unshrouded blades. The present alloy powder mixtures are used in a novel method for filling large holes, slots and widegap joints, or reforming extended surface areas, which method yields metal deposits with remelt temperatures (i.e., solidus temperatures) substantially greater than those produced by previous filling or repairing or brazing techniques.

2. Description of the Prior Art

It has become increasingly important, especially in high temperature aircraft applications such as, for example, in turbine engine components, to use materials for structural applications that are capable of withstanding the combination of both high temperatures and corrosive attaches normally associated therewith. Stainless steels and the so-called superalloys, such as nickel-base superalloy, have been employed where possible to meet requirements of high strength to weight ratios, corrosion resistance, etc. at elevated temperatures. However, the greatest impediment to the efficient use of these materials has been the difficulty in repairing of service damaged components.

Generally speaking, known brazing filler metal materials do not have the desired properties that are necessary for use in filling relatively large holes, slots and widegap joints and various other types of defects in high temperature superalloys such as those used in turbine engine high temperature components. In addition, known alloy powders and mixtures are completely unsatisfactory for rebuilding or reforming surface areas of high temperature superalloy bodies, such as blade tips, and therefore they are not intended for such use. As a result, superalloy bodies such as engines which develop these types of defects lose efficiency, and parts, many of which are very expensive, must be scrapped. In addition to these problems and disadvantages, conventional brazing filler metals do not simultaneously give good wetting, very limited flow, and the ability to bridge defects so that the defects are repaired without filler material flowing into internal passages in the components. This is as expected because brazing filler metals are designed to flow into spaces via capillary action, i.e., they liquify at the processing or use temperature and are drawn into the joint interfaces being united. Furthermore, known brazing filler compositions do not have the above desired properties along with the ability to provide both excellent high temperature and corrosion resistance and, when properly coated, survive in the harsh environment of a turbine engine. Thus, there is a great need for proper metal alloy mixtures that can be used to repair and/or rebuild surface areas of high temperature superalloy bodies and for techniques of using these mixtures for these purposes.

Previously, repair of high temperature superalloys has been attempted with brazing filler metal compositions but these materials, some of which are disclosed in U.S. Pat. Nos. 4,381,944, 4,379,121, 4,394,347, 4,442,968, 4,444,353, and 4,478,638 have been found ineffective for the reasons stated above.

Smith, Jr. et al U.S. Pat. Nos. 4,381,944 and 4,478,638 relate to alloy powder mixtures formulated to melt and flow into small cracks in superalloy bodies under vacuum conditions and at processing temperatures above about 2124° F. and up to about 2250° F. but below the remelt temperature of preexisting brazes. This is similar to conventional brazing or soldering, requires the use of high processing temperatures which can damage the superalloy body and/or superalloy coatings thereon, and does not permit the alloy powder composition to retain its shape and location on the superalloy body during processing so that surface reformation, such as blade tip reformation, can be made and large cracks can be filled and bridged without run-off or run-in.

SUMMARY OF THE INVENTION

The present invention relates to novel mixtures of silicon-free metal superalloy powder compositions comprising a major amount by weight of a first, low melting superalloy powder composition consisting essentially of from about 14 to about 16 percent by weight of chromium, from about 2.5 to about 3.2 percent by weight of boron and the balance nickel, and a minor amount by weight of a second, high melting superalloy powder composition preferably containing from about 11 to 15 weight percent cobalt, from about 3.0 to 10 weight percent tungsten, from about 3.5 to 10 weight percent tantalum, from about 3.5 to 4.5 weight percent titanium, from about 3 to 4 weight percent aluminum, from about 1.0 to 2.5 weight percent molybdenum, from about 0.1 to 3.0 weight percent hafnium, up to about 0.30 weight percent carbon, from about 0.03 to 0.25 weight percent zirconium, from about 0.005 to 0.025 weight percent boron, and the balance nickel, namely from about 38 to 67 weight percent nickel. Optionally, the silicon-free metal superalloy powder composition can also include a minor amount by weight, less than the weight percentage content of the second, high melting superalloy, of powdered nickel.

The total powder composition preferably comprises from about 55 to 90 weight percent of the first, low melting superalloy which has a melting point or liquidus temperature above about 1800° F. but below about 2000° F., from about 10 to 40 weight percent of the second, high melting superalloy which has a melting point above about 2200° F. but below about 2300° F., and from about 0 to 20 weight percent of powdered nickel. The powder composition has a processing temperature above about 2000° F. but below about 2100° F., preferably about 2050° F., at which temperature the low melting alloy powder melts and wets the high temperature alloy to form a non-flowing, semi-solid, putty-like composition having a high viscosity and high surface tension. These critical properties enable the composition to be processed at a relatively low temperature of 2000° F. to 2100° F. which will not damage the superalloy body being repaired, or superalloy coatings thereon. Moreover, these critical properties enable the composition to retain its shape and location, as applied to the body prior to processing, without flowing onto adjacent surface areas during processing, so that the composition can bridge large surface holes or routed-open cracks and can substantially retain its applied shape when applied and processed to reconstruct a portion of the body which has been eroded, corroded or routed away or otherwise is no longer present on the superalloy body being repaired, such as the worn off tip of a turbine blade. For these reasons the present compositions are not satisfactory for repairing or filling small unrouted cracks in superalloy bodies since the present compositions will not flow into such cracks during processing. The repair of such small cracks with the present compositions requires the routing of the small cracks to enable the composition to be applied directly to the areas to be repaired as a putty which substantially retains its shape and location during processing to fill and bridge the routed areas without any flow therefrom or thereinto.

DETAILED DESCRIPTION OF THE INVENTION

Techniques are being developed to repair gas turbine engine nickel-base alloy components, e.g., nozzels, that have thermal fatigue cracks and/or surface degradation both of which result from engine operation. The surface degradation can be the result of many reasons such as oxidation, hot-corrosion or erosion. In repairing the degradation, typically the damaged areas are first ground out to remove all of the undesirable material and leave a relatively clean surface after cleaning. The ground out areas are then directly filled with a filler metal slurry and then vacuum processed by a specific temperature cycle. The ground out areas are preferably nickel plated before vacuum processing if the base metal contains a high level of titanium and/or aluminum. To avoid damage to existing brazed joints and any protective surface coating, e.g., nickel-aluminide, of the component to be repaired, a filler metal with a relatively low liquidus temperature has been employed. In the prior use of the above-described technique for repair, the solidus or remelt temperature of the filler metal deposit was identical to the solidus of the original filler metal.

For this reason, only those components with operating temperatures below the solidus temperature of the filler metal were repairable by prior methods. In order to overcome this problem, i.e., to raise the solidus temperature of the deposits while keeping the deposition temperature below that which would cause damage to existing brazed joints and any protective coating, a novel powder metal mixture and method of using that mixture has been developed and are described herein and form the basis for the present invention.

Moreover, the present invention makes it possible, for the first time, to repair or reconstruct superalloy bodies or components which previously had to be discarded because extended surface portions thereof, such as unshrouded turbine blade tips, had been corroded, eroded or otherwise worn away. This is made possible by the present alloy powder mixtures which can be formulated to a putty-like, semi-solid consistency which is moldable as an extension onto a superalloy body to form a replacement for the missing surface extension thereof, and which retains its molded shape during heat processing, without flowing or running, to form an integral superalloy body extension which can be machined to a final desired shape and coated if necessary to restore the superalloy body for reuse at service temperatures up to about 2000° F.

According to the present invention, any suitable superalloy metal body may be filled using the novel filler metal powder mixtures described herein. It is preferred that such filling be conducted by a vacuum processing technique. Suitable metal bodies include for example, nickel-base superalloys that are typically used in turbine engine components, among others. While any suitable temperature resistant superalloy body may be repaired using the filler metal mixture of this invention, particularly good results are obtained with nickel-base superalloys.

The silicon-free metal powder mixture which forms the basis of the present invention comprises a mixture of (i) the powdered relatively low melting nickel-base alloy discussed hereinbefore, which is silicon-free and contains about 2.5 to 3.2 weight percent of boron as a melting point depressant, (ii) the powdered silicon-free nickel-based alloy melting above about 2200° F. discussed hereinbefore, and optionally (iii) powdered nickel. Generally the metal mixture will comprise about 55 to about 90 percent by weight low melting alloy, about 10 to about 40 percent by weight high melting alloy, and 0 to about 20 percent by weight nickel. More preferably, the mixture will comprise about 60 to about 85 percent by weight low melting alloy, about 15 to 40 percent by weight high melting alloy, and 0 to about 15 percent by weight nickel. Still more preferably, the mixture will comprise about 63 to above 82 percent by weight low melting alloy, about 18 to about 37 percent by weight high temperature alloy, and 0 to about 12 percent by weight nickel. Most preferably, the mixture will comprise either (i) about 68 to about 72 percent by weight low melting alloy, about 18 to about 22 percent by weight high temperature alloy, and about 8 to 12 percent by weight nickel or (ii) about 63 to about 67 percent by weight low melting alloy and about 33 to about 37 percent by weight high temperature alloy.

The low melting alloys useful herein are those nickel-based alloys which have liquidus temperatures above about 1800° F. but below about 2000° F. and below the processing temperature of about 2000°–2100° F. to be used. Preferably, the liquidus temperature will be in the range of about 1925° to about 1975° F. In addition, the alloy must be substantially silicon-free. The alloy contains a critical amount of boron as the melting point depressant and comprises from about 14 to about 16 percent, most preferably about 15 percent, by weight chromium, from about 1.5 to about 3.2 percent most preferably about 2.8 percent by weight boron, and the balance nickel, most preferably about 82.2 percent by weight.

The preferred silicon-free high melting alloys useful herein are those nickel-based alloys disclosed in U.S. Pat. No. 3,807,993, which melt above about 2200° F. Such alloys have the composition disclosed hereinbefore and contain nickel, aluminum, boron, carbon, chromium, cobalt, hafnium, molybdenum, zirconium, tantalum, titanium and tungsten. Examples of such commercially-available alloys include C101 in a powder form. Most preferably, the high temperature alloy will comprise about 12.2 to about 13% chromium, about 8.5 to about 9.5% cobalt, about 3.85 to about 4.5 tantalum, about 3.85 to about 4.5% tungsten, about 3.85 to about 4.15% titanium, about 3.2 to about 3.6% aluminum, about 1.7 to about 2.1% molybdenum, about 0.75 to about 1.05% hafnium, about 0.07 to about 0.2% carbon about 0.03 to about 0.14% zirconium, about 0.01 to about 0.02% boron, and the balance nickel, all percents being by weight.

The metal powder mixtures of the present invention must, after processing, have a solidus temperature, as determined by differential thermal analysis, of at least 1950° F., preferably at least 2000°. In addition, the mixtures must be capable of being processed at a temperature of about 2000° F., preferably 2050° F. Moreover, the mixture must not flow when heated to the processing temperature, i.e., it must have a sufficiently high viscosity and surface tension that it will not flow out of the shape or place in which it is deposited. The processing temperature is selected to be above the melting point of the low melting alloy but below the melting point of the high melting alloy as this allows the high melting alloy to form a homogenous mixture by the alloying action of the liquid low melting alloy coming in contact with the high melting alloy powder. In addition, the metal mixture should be prepared using similar size particles to minimize and preferably avoid segregation. preferably the particle size is $-200$ and $+325$ U.S. mesh.

The processed metal mixtures of the present invention may be coated with coating schemes that are typically used for high temperature superalloys. When properly coated, these metals survive in the harsh environment of a turbine engine. Depending upon the nature of the base metals to be repaired, a very thin layer of nickel may be plated onto the area needing repair or build-up prior to applying the metal mixture. When a nickel-base metal body being repaired contains higher concentrations of aluminum and titanium, for example, it is particularly advantageous to first apply this nickel coating.

To utilize the metal mixture described above to repair and/or reform surface areas of a particular part, the following sequence of steps is preferably followed:

1. First, determine the maximum temperature which can be tolerated by the component to be repaired without damaging existing brazed joints, coatings, and materials. The deposition or processing temperature to be used will be this maximum temperature or close thereto.
2. Select a low melting alloy with a liquidus below the acceptable temperature to be used.
3 Select a high temperature alloy with a melting point above the acceptable temperature to be used.
4. Uniformly mix the selected alloys optionally with nickel powder in the desired proportions.
5. Uniformly mix the metal powder mixture of step 4 with an organic binder, such as those used in conventional brazing, to form a putty-like moldable composition.
6. Route out damaged areas, if necessary, to form holes or slots and clean surface areas for reconstruction.
7 Directly fill completely the hole, slot or area to be repaired and/or apply a molded mass as an extension on the surface areas to be reformed, using the semi-solid metal mixture of step 5. Based on the chemical composition of the component being repaired preplating with nickel may be required. In addition, the component must be properly cleaned prior to deposition, though unusual cleaning efforts with penetrating materials such as fluoride ions are not necessary.
8. Place the component in a vacuum furnace or an inert or hydrogen gas furnace.
9. Heat the component to the processing temperature and hold at this temperature for about 10 minutes. Then continue to heat either at this temperature or at a lower temperature until adequate chemical homogenization is achieved. This usually will take several hours or more depending on the specific metal mixture utilized.
10. Solution, precipitation heat treat, and recoat as required based on the heat treatment and coating requirements of the component.

Both hot wall retort and cold wall radiant shield furnaces may be used while performing the deposition of the metal mixture compositions as defined by the present invention. However, because of some inherent advantages, cold wall furnaces are by far the more widely used.

When employing a vacuum technique, the vacuum pumping system should be capable of evacuating a conditioned chamber to a moderate vacuum, such as, for example; about $10^{-3}$ torr, in about 1 hour. The temperature distribution within the work being repaired should be reasonably uniform (i.e., within about $+10°$ F).

The present invention will be further illustrated by the following non-limiting examples in which all parts and percentages are by weight unless otherwise specified.

EXAMPLE 1

Holes up to 0.20-in. in diameter were drilled in 0.100-in. thick nickel0base alloy specimens to simulate ground out cracks and eroded areas typically found in turbine airfoils damaged during engine operation. A filler metal powder mixture was mixed with an organic binder and applied to these holes. The filler metal mixture consisted nominally of 65% of a low melting alloy, 10% pure nickel and 25% of an alloy melting above 2100° F. The low melting alloy had a nominal composition of 2.8% B, 15.0% Cr and 82.2% Ni. The high melting point alloy is C101 having a nominal composition of 0.09% C, 12.6% Cr, 9.0% Co, 1.9% Mo, 4.3% W, 4.3% Ta, 4.0% Ti, 3.4% Al, 0.9% Hf, 0.015% B, 0.06% Zr, and balance Ni. All of the specimens were subjected to the same deposition/homogenization treatment cycle: 2050° F. for 10 minutes in a vacuum at $0.5 \times 10^{-3}$ torr maximum pressure followed by 1925% for 20 hours in a vacuum at $0.5 \times 10^{-3}$ torr maximum pressure.

Differential thermal analyses were conducted on the deposits. A solidus of 1983° F. and a liquidus of 2020° F. were obtained for the deposits compared with 1930° F. for both the solidus and liquidus of the original low melting alloy alone. Visual, fluorescent penetrant, radiographic and metallograhic examinations were conducted on the deposits. Excellent soundness and surface geometry were obtained. Results indicated that the filler metal had a high enough viscosity and surface tension during processing so that it did not flow out of the holes being repaired.

EXAMPLES II AND III

The basic procedure of Example 1 were repeated with two different formulations using low melting alloys consisting of 1.9% B, 15% Cr, and 83.1% Ni (Example II) and 3.5% B, 15% Cr and 81.5% Ni (Example III). The nominal compositions and the DTA results were:

|  | EXAMPLE | |
| --- | --- | --- |
| COMPOSITION | II | III |
| Low melting alloy | 75 | 70 |
| High melting alloy | 25 | 20 |
| Nickel | 5 | 10 |
| DTA Result, °F. | 1977 | 1970 |

The composition of Example II was processed at 2125° F. for 10 minutes and then at 1925° F. for 20 hours. The composition of Example III was processed at 2000° F. for 6 hours and then at 1900° F. for ten hours.

EXAMPLE IV

The basic procedure of Example I was repeated except that the metal mixture nominally comprised 35% of the high temperature alloy and 65% of the low melting alloy consisting of 2.8% B, 15% Cr, and 82.2% Ni. The sample was processed at 2050° F. for ten hours.

EXAMPLE V

The basic procedure of Example I was repeated except that the metal mixture nominally comprised 35% of the high temperature alloy and 65% of the low melting alloy consisting of 2.8% B, 15% Cr, and 82.2% Ni. The sample was processed at 2050° F. for 10 minutes followed by 20 hours at 1925° F. The sample exhibited superior soundness and DTA yielded a solidus temperature of 2014° F.

COMPARATIVE EXAMPLE A

The basic procedure of Examples I–IV was repeated for a variety of metal mixture formulations and thermal cycles as identified below in Table I. In each case a sound deposit was produced but DTA determined that the solidus of each was too low to be useful in the present invention.

TABLE I

Results of Comparative Example A

| | Sample | | | |
| --- | --- | --- | --- | --- |
| Composition | 1 | 2 | 3 | |
| Low melting alloy | 100[1] | 75[2] | 70[2] | 70[2] |
| High melting alloy | — | 15[3] | 30[4] | 20[3] |
| Nickel | — | 10 | — | 10 |
| Thermal Cycle | | | | |
| 0 min. at °F. followed by 20 hours at 1025° F. | 2125 | 2000 | 2000 | 2000 |
| Solidus, °F. | 1946 | 1930 | 1931 | 1920 |

[1]Alloy comprised 1.9% B, 15% Cr, 83.1% Ni.
[2]Alloy comprised 3.5% B, 15% Cr, 81.5% Ni.
[3]Alloy - same as Example I (C101)
[4]Alloy 625 which comprises 21.5% Cr, 9.0% Mo, 3.65% Cb + Ta, 65.85% Ni.

COMPARATIVE EXAMPLE B

The basic procedure of Examples I–V was repeated for various metal mixtures as identified in Table II below. each of the samples was processed at either 2000° F. or 2050° F. for 10 minutes and then allowed to cool. All of the samples were then visually evaluated and all were found to be unsound as specified in Table II. Thus no extended heating for homogenization was conducted. These results indicate that only the mixtures specified give the desired results.

TABLE II

Results of Comparative Example B

| Sample | Formulation, % | Results |
| --- | --- | --- |
| 5. | Low melt. of Ex. III -75 C101 -25 | Excessive porosity |
| 6. | Low melt. of Ex. III -75 Ni-Cr-Al-y -25 | Poor wetting, bridging and bonding, excessive porosity |
| 7. | Low melt. of Ex. III -65 C101 -35 | Poor wetting, bridging and bonding, excessive porosity |
| 8. | Low melt. of Ex. III -50 C101 -50 | Poor wetting, bridging and bonding, excessive porosity |
| 9. | Low melt. of Ex. III -70 Hastelloy X -30 | No wetting |
| 10. | Low melt. of Ex. III -70 Inconel 718 -20 Nickel -10 | Poor wetting/bonding and bridging |
| 11. | Low melt of Ex. III -70 Ni-Cr (80-20) -20 Hastelloy X -10 | Poor wetting/bonding and bridging |
| 12. | Low melt of Ex. III -75 Hastelloy X -25 | Poor wetting/bonding and bridging |
| 13. | Low melt of Ex. III -70 Inconel -20 Nickel -10 | Heavy Porosity |
| 14. | Low melt of Ex. II -65 C101 -35 | Heavy Porosity, Unsound |
| 15. | Low melt of Ex. I -65 Hastelloy X -35 | Unsound |
| 16. | Low melt of Ex. I -65 Hastelloy X -25 Nickel -10 | Unsound |

While specific components of the present system are defined in the working examples above, any of the other typical materials indicated above may be substituted in the working examples, if appropriate. In addition, while various specifics are given in the present application, many modifications and ramifications will occur to those skilled in the art upon reading of the present disclosure. All of these are intended to be covered herein.

What is claimed is:

1. A method for repairing damaged superalloy bodies which comprises (a) applying directly into holes or slots or widegap joint damages on such bodies or reconstructing damaged, missing or worn surface extensions of such bodies, such as blade tips, a semi-solid, form-retaining, substantially silicon-free metal alloy powder mixture capable of being processed at a temperature of between about 2000° F. and 2100° F., said metal alloy mixture comprising (i) a major amount by weight of a first, lower melting, nickel-base superalloy powder composition consisting essentially of from about 14 to 16 weight percent chromium, from about 2.5 to 3.2 weight percent boron and the balance nickel, said lower melting composition having a liquidus above about 1800° F. and below about 2000° F.; (ii) a minor amount by weight of a second, higher melting, nickel-base superalloy powder composition containing from about 38 to 67 weight percent nickel, from about 11 to 15 weight percent chromium, from about 8 to 12 weight percent cobalt, from 3 to 10 weight percent tungsten, from 3.5 to 10 weight percent tatanlum, amounts less than about 5.0 weight percent each of titanium, aluminum, molybdenum and hafnium, amounts less than about 0.5 weight percent each of carbon and zirconium, and from about 0.0005 to 0.025 weight percent boron, said higher melting composition having a liquidus above about 2200° F. but below about 2300° F.; and (iii) an optional minor amount by weight, less than the amount of said higher melting composition (ii), of nickel powder, (b) heating said applied metal alloy powder mixture to a processing temperature between about 2000° F. and 2100° F. for a sufficient time to cause the lower melting powder (i) to melt and alloy with the higher melting powder (ii), and with the nickel powder (iii), if present, for forming a semi-solid high viscosity, high surface-tension, form-retaining composition having a solidus temperature of at least about 1950° F., and (c) cooling said processed composition to form a sound, non-porous deposit which fills and bridges the holes, slots and widegap joints and retains substantially the same shape on a superalloy body being repaired before and after processing.

2. The method of claim 1 wherein after step (b) the assembly is continued to be heated at or below said processing temperature for a time to allow chemical homogenization of said metal mixture to occur.

3. The method of claim 1 wherein step (b) is conducted under a vacuum.

4. The method of claim 1 wherein step (b) is conducted under an inert or hydrogen atmosphere.

5. The method of claim 1 wherein said metal mixture includes an organic binder.

6. The method of claim 1 wherein the metal mixture comprises, by weight, about 55 to about 90 percent low melting alloy (i), about 20 to about 40 percent higher melting alloy (ii), and 0 to about 20 percent nickel.

7. The method of claim 1 wherein the metal mixture comprises, by weight, about 60 to about 85 percent low melting alloy, about 10 to about 40 percent higher melting alloy (ii), and 0 to about 15 percent nickel.

8. The method of claim 1 wherein the metal mixture comprises, by weight, about 63 to about 82 percent low melting alloy (i), about 18 to 37 percent higher melting alloy (ii), and 0 to about 12 percent nickel.

9. The method of claim 1 wherein the low melting alloy comprises about 2.8 weight boron.

10. The method of claim 1 wherein the low melting alloy has a solidus temperature of about 1925° to about 1975° F.

11. The method of claim 1 wherein the low melting alloy comprises, by weight, about 15 percent chromium, about 2.8 percent boron, and the balance nickel.

12. The method of claim 11 wherein the higher melting alloy (ii) comprises, by weight, about 12.2% to about 13.0% chromium, from about 8.5% to about 9.5% cobalt, from about 3.85% to about 4.50% tungsten, from about 3.85% to about 4.50% tantalum, from about 3.85% to about 4.15% titanium, from about 3.2% to about 3.6% aluminum, from about 1.70% to about 2.10% molybdenum, from about 0.75% to about 1.05% hafnium, from about 0.07% to about 0.02% carbon, from about 0.03% to about 0.14% zirconium, from about 0.01% to about 0.02% boron and the remainder nickel.

13. The method of claim 12 wherein the metal mixture comprises, by weight, about 70% of the low melting alloy, about 20% of the higher melting alloy, and about 10% nickel.

14. The method of claim 12 wherein the metal mixture comprises, by weight, about 65% of the low melting alloy, about 25% of the higher melting alloy, and about 10% nickel.

15. The method of claim 12 wherein the metal mixture comprises, by weight, about 75% of the low melting alloy, about 20% of the higher melting alloy, and about 5% nickel.

16. The method of claim 12 wherein the metal mixture comprises, by weight, about 80% of the low melting alloy and about 20% of the higher melting alloy.

17. The method of claim 12 wherein the metal mixture comprises, by weight, about 65% of the low melting alloy and about 35% of the higher melting alloy.

18. The method of claim 1 wherein the solidus temperature of the deposited mixture is at least 2000° F. and the deposition temperature is at least 2050° F.

19. The method of claim 1 wherein the superalloy being repaired is nickel-based.

20. The method of claim 19 which comprises first coating a thin layer of nickel onto the area of the body to be repaired.

21. A method of repairing a damage in a high temperature superalloy component while not causing damage to existing brazed joints and coatings thereon which comprises:
(a) determining the maximum temperature which can be tolerated by the component without damaging existing brazed joints and coatings;
(b) selecting a powdered nickel-based substantially silicon-free low melting alloy (i) which has a liquidus temperature above 1800° F. and (i) below about 2000° F. and (i) consisting essentially of from about 14 to 16 weight percent chromium, from about 2.5 to 3.2 weight percent boron and the balance nickel;
(c) selecting a powdered nickel-based substantially silicon-free higher melting alloy (ii) having a melting point above 2100° F. and consisting essentially of from about 38 to 67 weight percent nickel, from about 11 to 15 weight percent chromium, from about 8 to 12 weight percent cobalt, from 3 to 10 weight percent tungsten, from 3.5 to 10 weight percent tantanlum, amounts less than about 5.0 weight percent each of titanium, aluminum, molybdenum and hafnium, amounts less than about 0.5 weight percent each of carbon and zirconium, and from about 0.0005 to 0.025 weight percent boron, said higher melting composition having a liquidus above about 2200° F. but below about 2300° F.;
(d) uniformly mixing the alloy powders (i) and (ii), optionally with nickel powder, in the desired proportions;
(e) uniformly mixing the metal powder mixture of (d) with an organic binder to form a semi-solid, form-retaining composition;
(f) routing out the damage, if necessary, to form a hole, slot or widegap joint or receptive surface;
(g) directly filling or reconstructing the damage to be repaired with the mixture of (e);
(h) placing the component in a furnace;
(i) heating the component to a temperature between about 2000° F. and 2100° F. for about 10 minutes and then continuing to apply heat until chemical homogenization is achieved.

22. The method of claim 21 wherein the repaired damage will withstand a temperature of at least 1950° F. in subsequent use.

23. The method of claim 21 wherein the heating in (i) is to at least 2050° F. and the repaired damage will withstand a temperature of at least 2000° F. in subsequent use.

24. The method of claim 21 wherein the low melting alloy comprises about fifteen percent chromium, about 2.8 weight percent boron, and the balance nickel.

25. The method of claim 21 wherein the higher melting alloy of step (c) is as defined in claim 12.

26. The method of claim 21 wherein the furnace is a vacuum furnace.

27. The method of claim 21 wherein the superalloy being repaired is nickel-based and a thin layer of nickel is plated onto the area to be repaired before step (f).

* * * * *

UNITED STATES PATENT AND TRADEMARK OFFICE
CERTIFICATE OF CORRECTION

PATENT NO. : 5,040,718

DATED : August 20, 1991

INVENTOR(S) : Lee et al

It is certified that error appears in the above-identified patent and that said Letters Patent is hereby corrected as shown below:

Col.10, line 20, after "and" delete --(i)--.

Col. 10, line 21, after "and" delete --(i)--.

Signed and Sealed this

Tenth Day of November, 1992

Attest:

DOUGLAS B. COMER

*Attesting Officer*     *Acting Commissioner of Patents and Trademarks*